United States Patent [19]
Richter

[11] Patent Number: 5,788,002
[45] Date of Patent: Aug. 4, 1998

[54] TRANSPORT DEVICE BEING MOVABLE AUTOMATICALLY INSIDE A PIPE

[75] Inventor: Bernd Richter, Erlangen, Germany

[73] Assignee: Siemens Aktiengesellschaft, Munich, Germany

[21] Appl. No.: 509,413

[22] Filed: Jul. 31, 1995
(Under 37 CFR 1.47)

[30] Foreign Application Priority Data

Feb. 1, 1993 [DE] Germany .................. 43 02 731.8

[51] Int. Cl.$^6$ .................................. B62D 37/032
[52] U.S. Cl. ................................. 180/8.5; 180/8.1
[58] Field of Search .................. 180/8.5, 8.6, 8.1,
180/7.1, 7.2, 164, 901; 348/84; 299/31; 901/1

[56] References Cited

U.S. PATENT DOCUMENTS 4,674,949  6/1987  Kroczynski ................ 180/8.5
5,351,626  10/1994  Yanagisawa ............... 180/8.6

FOREIGN PATENT DOCUMENTS 0461964  12/1991  European Pat. Off. ........ 180/8.1
0085085  5/1985  Japan ......................... 180/8.1
61-14371  1/1986  Japan .
62-210183  9/1987  Japan .
1-132940  5/1989  Japan .
1-186462  7/1989  Japan .
0038192  2/1990  Japan ......................... 180/7.1

*Primary Examiner*—Anne Marie Boehler
*Attorney, Agent, or Firm*—Herbert L. Lerner; Laurence A. Greenberg

[57] ABSTRACT

A transport device being movable automatically inside a pipe includes at least two clamping units to be displaced counter to one another and braced mechanically independently of one another in a pipe. Each of the clamping units has a base with a variable length and ends, as well as a plurality of clamping elements joining the ends together, for radial moving the clamping elements by varying the length of the base.

8 Claims, 4 Drawing Sheets

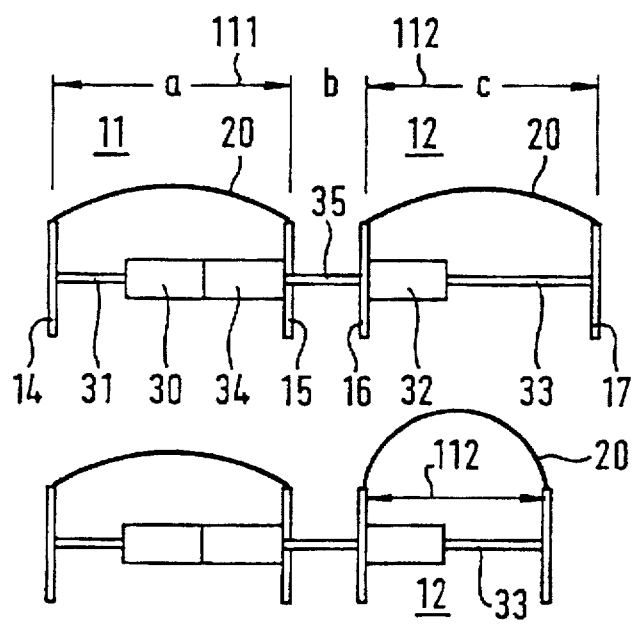
FIG 2
FIG 3
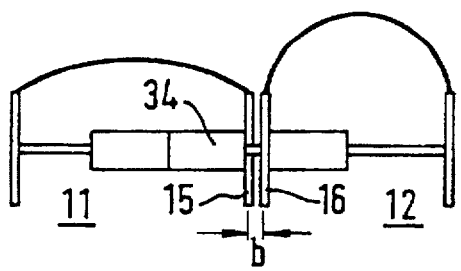
FIG 4
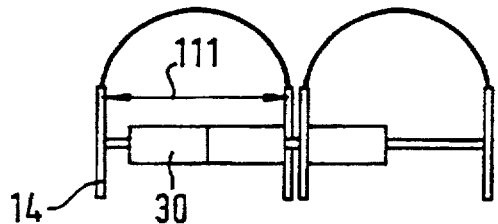
FIG 5
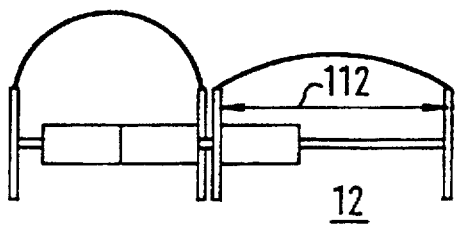
FIG 6
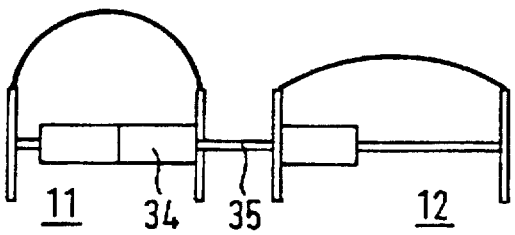
FIG 7

TRANSPORT DEVICE BEING MOVABLE AUTOMATICALLY INSIDE A PIPE

CROSS-REFERENCE TO RELATED APPLICATION

This application is a Continuation of International Application Serial No. PCT/DE94/00071, filed Jan. 27, 1994.

BACKGROUND OF THE INVENTION

FIELD OF THE INVENTION

The invention relates to a transport device being movable automatically inside a pipe, of the type which is known, for instance, from German Patent DE 31 11 814 C2, corresponding to Published European Application 0 061 078 A3 and to U.S. Pat. No. 4,460,920.

Wheel-driven or chain-driven transport devices, for instance, are known for transporting tools or testing devices through the interior of a pipe under remote control. However, those known transport devices are suitable only for pipelines that are laid substantially horizontally. Nor can they be used in flooded pipelines, except under certain conditions.

German Patent DE 31 11 814 C2, corresponding to Published European Application 0 061 078 A3 and to U.S. Pat. No. 4,460,920, discloses a self-propelled pipe manipulator for remote-controlled transport of tools or testing devices. It includes a two-member walking device or set of walking legs, with one rear and one front walking body. The two walking bodies are pivotably joined to one another and can be displaced axially relative to one another. The two walking bodies can be fixed in alternation in the pipe, in order to enable a creeping forward motion of the manipulator in the pipe. In order to provide for their fixation in the pipe, the walking bodies each include two support flanges, on each of which is disposed a plurality of hydraulic cylinders having piston rods that can be extended radially, thus causing the walking legs to become wedged in the pipe. Even vertical segments of pipe can then be overcome.

However, in that known manipulator, the position of the hydraulic cylinders on the support flanges must be adapted to the pipe diameter in each case, because the stroke of the radially extensible piston rods is limited by the smallest accessible pipe diameter. Since the progression is also supported on ball rollers, it is practically impossible to overcome changes in cross section over the course of the pipe. Moreover, it is not possible for the known manipulator to move through branching pipe segments or segments into which other pipes open.

SUMMARY OF THE INVENTION

It is accordingly an object of the invention to provide a transport device being movable automatically inside a pipe, which overcomes the hereinafore-mentioned disadvantages of the heretofore-known devices of this general type and which is simple in structure and can be used even in segments of pipe that have changes in cross section and obstacles as well as in branching pipes.

With the foregoing and other objects in view there is provided, in accordance with the invention, a transport device being movable automatically inside a pipe, comprising at least two clamping units to be displaced counter to one another and braced mechanically independently of one another in a pipe, each of the clamping units having a base with a variable length and ends, and having a plurality of clamping elements joining the ends together, for radial moving the clamping elements by varying the length of the base.

Since the clamping units, which can be braced mechanically independently of one another, each include a variable-length base having ends that are joined together with a plurality of clamping elements in such a way that a radial motion of these clamping elements can be brought about by varying the length of this base, an axial displacement is converted into a radial stroke, so that with one and the same transport device, movement is possible through pipes that have major differences in diameter. Moreover, only one axial motion is needed to brace the clamping units in the pipe, because this motion necessarily is transmitted to all of the clamping elements. This considerably reduces the structural complication and expense.

In accordance with another feature of the invention, the clamping units are disposed relative to one another in such a way that their bases are spatially superimposed on one another. This provision makes a shorter structure possible, which in turn enables progression even in pipe segments with short radii of curvature.

In accordance with a further feature of the invention, the clamping elements are flexible rods with a rectangular or circular profile, preferably glass fiber rods.

In accordance with an added feature of the invention, instead of flexible rods, there are provided jointed arms joined to one another at one end in a crown hinge and carrying a support element joined to the crown hinge.

In accordance with an additional feature of the invention, the clamping units have pneumatic drive units for thrusting and for clamping.

In accordance with yet another feature of the invention, the clamping elements are pivotably joined to the ends of the bases.

In accordance with yet a further feature of the invention, the clamping elements have ends, and the ends of the bases are each formed by one respective clamping plate on which the ends of the clamping elements are fixed.

In accordance with a concomitant feature of the invention, the clamping elements have a given direction of motion, and there are provided clamping devices in which the ends of the clamping elements are fixed, the clamping devices each being pivotably supported on the clamping plates about an axis oriented perpendicularly to the given direction of motion of the clamping elements.

Other features which are considered as characteristic for the invention are set forth in the appended claims.

Although the invention is illustrated and described herein as embodied in a transport device being movable automatically inside a pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2-7 are elevational views on a reduced scale illustrating a course of motion during progression of the transport device shown in FIG. 1;

DESCRIPTION OF THE PREFERRED EMBODIMENTS

Figure 1:
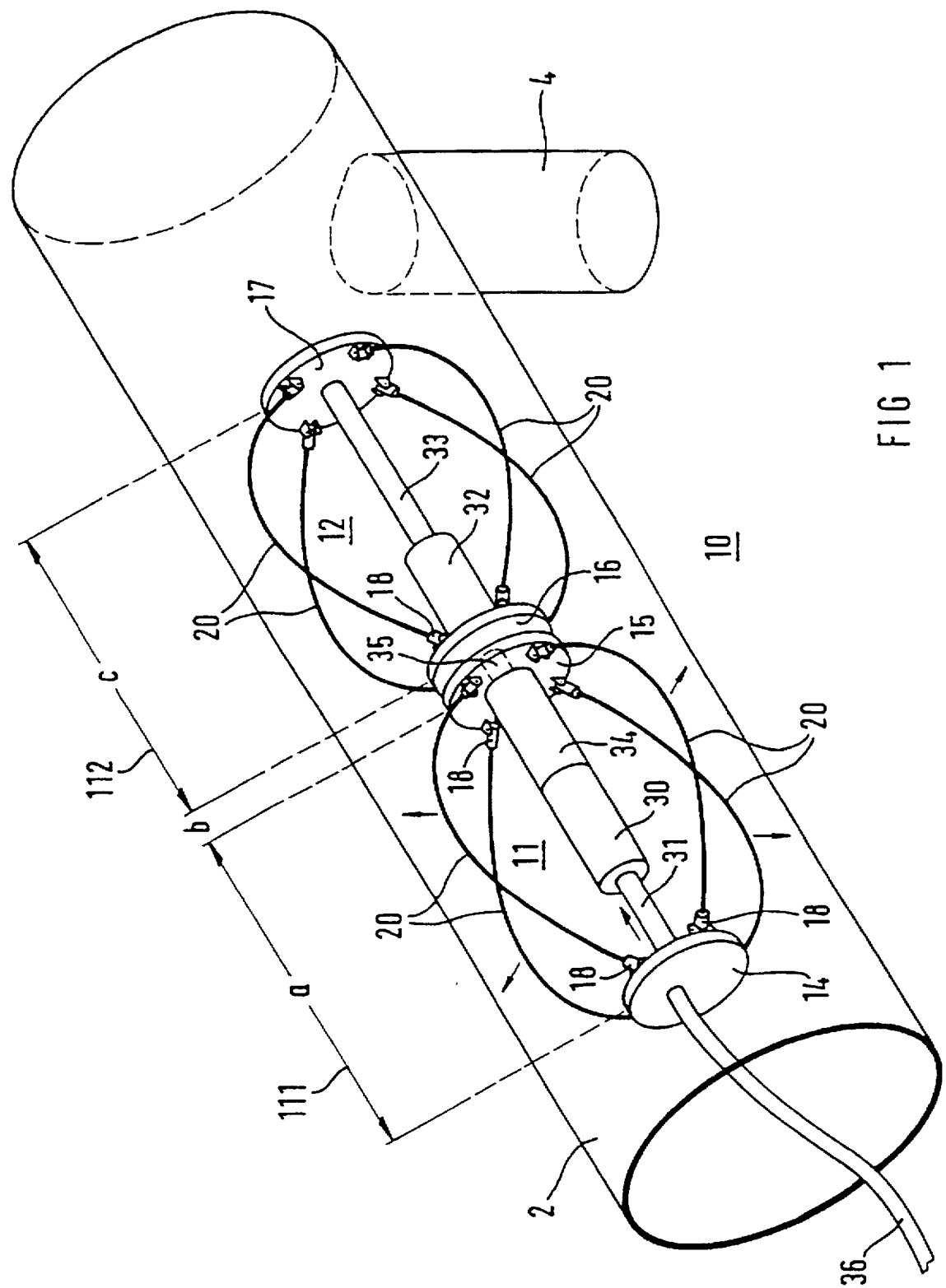
FIG. 1 is a diagrammatic, perspective view of a transport device according to the invention.

Referring now to the figures of the drawing in detail and first, particularly, to FIG. 1 thereof, there is seen a perspective view of a transport or walking device or a set of walking legs 10 in a pipe 2 that has a pipe branch 4. The walking device or legs 10 include two clamping units 11 and 12, each of which includes two clamping plates 14, 15 and 16, 17, respectively, that are axially displaceable relative to one another. Disposed on each of the clamping plates 14–17 is a plurality of clamping devices 18, namely four in the example shown, in which ends of curved clamping elements 20 are fixed. Non-illustrated device holders for testing devices or machining devices can be provided on the end clamping plate 17. Elastic flexible rods of circular or rectangular cross section are preferably provided as the clamping elements 20. Glass fiber rods of circular cross section are especially suitable. The clamping plates 14 and 15 form a base 111, and the clamping plates 16 and 17 form another base 112. Respective lengths a and c of these bases define a state of flexion of the respective clamping elements 20 assigned to them.

In order to increase the coefficient of friction, the glass fiber rods that are preferably provided as the clamping elements 20 are sheathed with fabric tubing, such as woven PVC tubing. Various coefficients of friction at the walls of the pipe can then be attained by changing the material of which the tubing is made.

Linear drives, for instance electrical or hydraulic linear drives, which are preferably a pneumatic clamping cylinder 30 and a pneumatic thruster cylinder 34, are disposed between the clamping plates of the clamping unit 11, namely the outer clamping plate 14 and the inner clamping plate 15 which is oriented toward the clamping unit 12. The pneumatic cylinders 30 and 34 are fixed relative to one another and to the inner clamping plate 15. A piston rod 31 of the clamping cylinder 30 acts on the outer clamping plate 14, so that through the use of an axial motion of this piston rod 31, a spacing between the outer clamping plate 14 and the inner clamping plate 15, or in other words the length a of the base formed by the clamping plates 14 and 15, can be varied. A motion of the piston rod 31 in the direction of an arrow shown parallel to it brings about a shortening of this base 111, and thus a radial motion of the clamping elements 20 which is likewise represented by arrows, with the radial motion being oriented outward toward the inner wall surface of the pipe. The clamping devices 18 are preferably disposed pivotably on the clamping plates in a pivot shaft that extends at right angles to the longitudinal axis and to the plane defined by the various clamping elements 20. As a result, the forces exerted on the clamping elements 20 as they press against the inner wall surface of the pipe 2 are absorbed by the clamping devices parallel to the longitudinal axis of these clamping elements 20, and kinking is thus avoided.

A piston rod 35 of the thruster cylinder 34, which is secured to the inner clamping plate 15, protrudes through the inner clamping plate 15 and is force-lockingly joined to the inner clamping plate 16 of the clamping unit 12. A force-locking connection is one which connects two elements together by force external to the elements, as opposed to a form-locking connection which is provided by the shapes of the elements themselves. Through actuation of the thruster cylinder 34, a spacing b between the inner clamping plates 15 and 16 can thus be varied. The piston rod 35 can also be pivotably joined to the clamping plate 16, so that the clamping units 11 and 12 can be swiveled counter to one another, making it easier to pass through tight curves in the pipe.

The clamping plates 16 and 17 of the clamping unit 12 are likewise joined to one another through a clamping cylinder 32 and a piston rod 33, so that the length c of the base 112, which is formed between the inner clamping plate 16 and the outer clamping plate 17, can be varied in the same way as with the clamping unit 11.

A supply line 36 which is also shown in the drawing contains pneumatic lines needed for clamping and unclamping the clamping cylinders 30 and 32.

In the case of pipes 2 having a diameter of approximately 600 mm to 800 mm, suitable dimensions for the lengths a, c of the bases 111 and 112 are approximately 900 mm each, and the maximum spacing b is approximately 150 mm to 200 mm. In this embodiment, the diameters of the clamping plates 14–17 are approximately 200 mm. Glass fiber rods with a diameter of approximately 9 mm are suitable as clamping elements 20 in this embodiment.

FIG. 2 shows a situation in which the two clamping units 11 and 12 are unclamped, or in other words in which the piston rods 31 and 33 are extended by the maximum distance.

Retraction of the piston rod 33 and the attendant shortening of the base 112 of the clamping unit 12 cause the clamping element 20 to curve outward as shown in FIG. 3 and be pressed against a non-illustrated inner wall surface of the pipe. As a result, the clamping unit 12 is wedged in the pipe. Shortening the spacing b between the inner clamping plates 15 and 16 with the aid of the thruster cylinder 34 pulls the clamping unit 11 against the clamping unit 12, as is shown in FIG. 4.

In the next step, pressure imposed by the clamping cylinder 30 of the clamping unit 11 pulls the outer clamping plate 14 against the clamping cylinder 30. This shortens the base 111 and analogously results in wedging of the clamping unit 11 in the pipe, so that in this motion increment shown in FIG. 5, both clamping units are fixed in the pipe.

Then, as is shown in FIG. 6, beginning in this position, the clamping unit 12 can be unclamped by suitable lengthening of its base 112, and as is shown in FIG. 7 it can be displaced to the right by extending the piston rod 35 of the thruster cylinder. A subsequent reclamping of the clamping unit 12 then leads to a situation as in FIG. 3, in which however the entire walking device or set of walking legs 10 has progressed to the right. Through alternating clamping and unclamping of the clamping cylinders 30, 32 and of the thruster cylinder 34, it is thus possible to produce a walking or creeping kind of forward or rearward motion.

Figure 8:
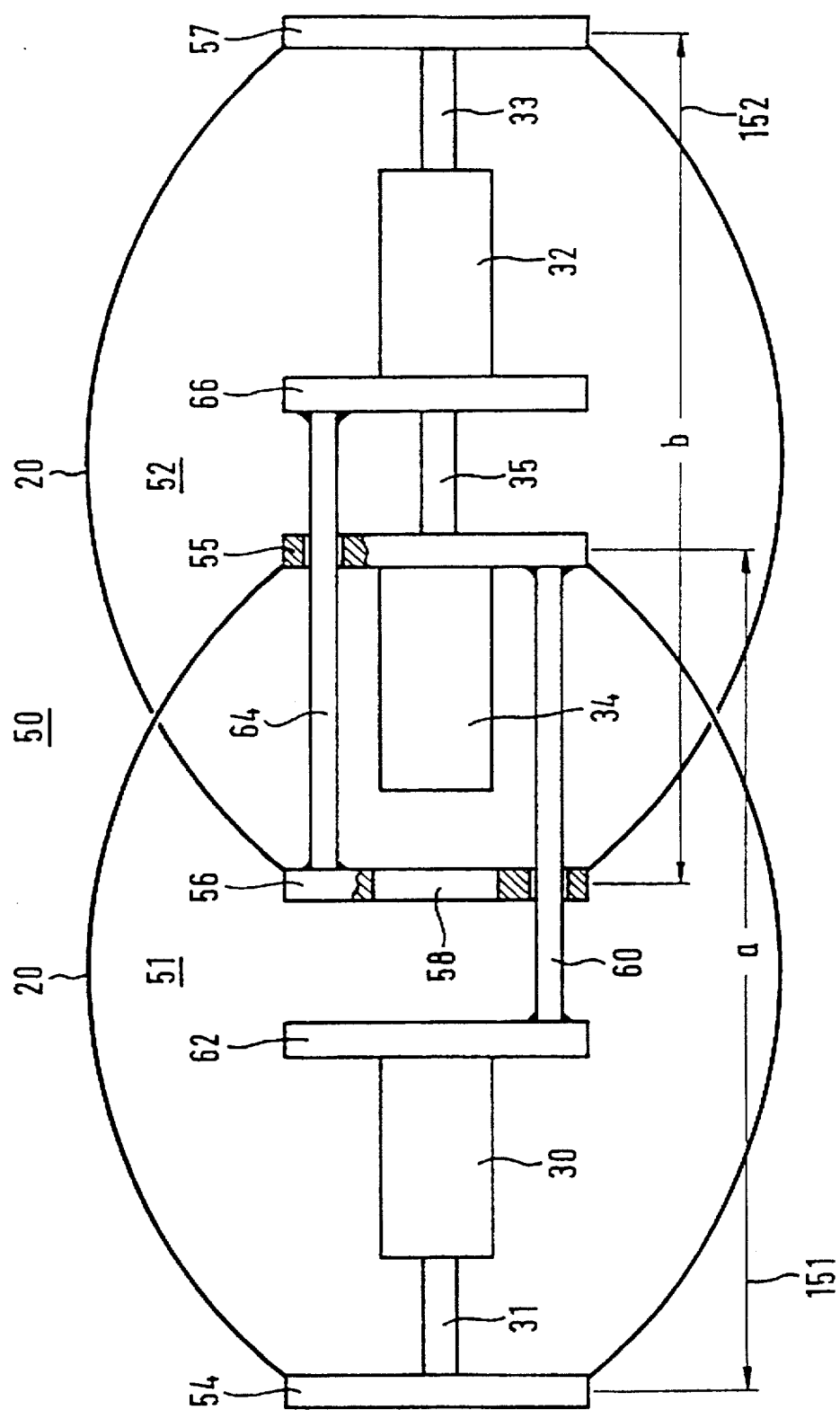
FIG. 8 is an enlarged, longitudinal-sectional view of an advantageous embodiment of the invention.

In the particularly preferred embodiment shown in FIG. 8, a walking device or set of walking legs 50 is provided that includes two clamping units 51 and 52, having respective bases 151 and 152 that are spatially superimposed on one another. In this embodiment, the thruster cylinder 34 is spatially separated from the clamping cylinders 30 and 32 and is axially displaceable relative to them. For that purpose, the thruster cylinder 34 is fixed on an inner clamping plate 55 of the clamping unit 51. This clamping plate 55 is rigidly joined, through a securing rod 60, to a securing plate 62 on which the clamping cylinder 30 of the clamping unit 51 is fixed. In this exemplary embodiment, the securing rod 60 reaches through a corresponding recess or bore in an inner clamping plate 56 of the clamping unit 52. This makes a compact construction possible. The clamping plate 56 in turn is also joined through a securing rod 64 to a securing plate 66 on which the clamping cylinder 32 of the clamping unit 52 is mounted. To that end, the securing rod 64 reaches through a recess in the inner clamping plate 55.

The thruster cylinder 34 acts directly on both the securing plate 62 assigned to the clamping unit 51 and the securing plate 66 assigned to the clamping unit 52. Depending on which of the two clamping units 51, 52 is wedged in the pipe, extending the piston rod 35 of the thruster cylinder 34 causes the unwedged clamping unit 52 or 51 to be thrust rightward or leftward. In order to make it possible to assure the longest possible stroke for the thrust, the inner clamping plate 56 of the thruster unit 52 is provided with a central opening 58, which enables the inner clamping plate 56 to slip over the thruster cylinder 34. Outer clamping plates 54 and 57 are also shown.

Figure 9:
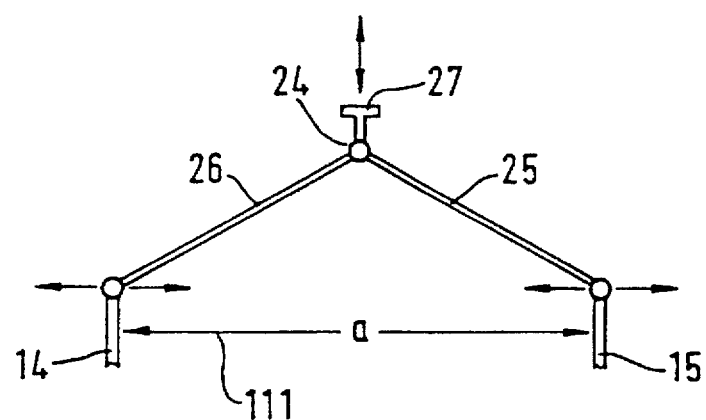
FIG. 9 is an elevational view of a jointed clamping element.

As is shown in FIG. 9, instead of elastic flexible rods, jointed arms 25 and 26 can be pivotably joined together in a crown hinge 24 and also can be pivotably secured to the ends of the respective base. The drawing shows this structure by taking the base 111, formed by the clamping plates 14 and 15 of the clamping unit 11, as an example. In this embodiment as well, a change in the length of the base 11 is converted into a displacement of the crown hinge 24, orthogonally thereto. A suitably shaped support element 27 disposed in the crown hinge 24 is then pressed outward against the non-illustrated inner wall surface of the pipe, by a shortening of the base 111.

I claim:

1. A transport device being movable automatically inside a pipe, comprising:
    at least two clamping units to be displaced counter to one another and braced mechanically independently of one another in a pipe, each of said clamping units having a base with a variable length and ends, and having a plurality of clamping elements joining said ends wherein a variation of the length of said base along a longitudinal axis thereof causes said clamping elements to move radially away from the longitudinal axis, and wherein said bases of said clamping units are spatially superimposed on one another.

2. The transport device according to claim 1, wherein said clamping units have pneumatic drive units for thrusting and for clamping.

3. The transport device according to claim 1, wherein said clamping elements are pivotably joined to said ends of said bases.

4. The transport device according to claim 1, wherein said clamping elements have ends, and said ends of said bases are each formed by one respective clamping plate on which said ends of said clamping elements are fixed.

5. The transport device according to claim 4, wherein said clamping elements have a given direction of motion, and including clamping devices in which said ends of said clamping elements are fixed, said clamping devices each being pivotably supported on said clamping plates about an axis oriented perpendicularly to said given direction of motion of said clamping elements.

6. The transport device according to claim 1, wherein said clamping elements are glass fiber rods.

7. A transport device being movable automatically inside a pipe, comprising:
    at least two clamping units to be displaced counter to one another and braced mechanically independently of one another in a pipe, each of said clamping units having a base with a variable length and ends, and having a plurality of clamping elements joining said ends, said clamping elements are jointed arms each having one end, a crown hinge joining said one ends to one another, and another end being pivotally joined to said ends of said bases.

8. A transport device being movable automatically inside a pipe, comprising:
    at least two clamping units to be displaced counter to one another and braced mechanically independently of one another in a pipe, each of said clamping units having a base with a variable length and ends, and having a plurality of clamping elements joining said ends together, for radially moving said clamping elements by varying the length of said base, wherein said clamping elements have ends, and said ends of said bases are each formed by one respective clamping plate, and wherein said clamping elements have a given direction of motion, and including clamping devices in which said ends of said clamping elements are fixed, said clamping devices each being pivotably supported on said clamping plates about an axis oriented perpendicularly to said given direction of motion of s aid clamping elements.

* * * * *